United States Patent Office 3,010,318
Patented Nov. 28, 1961

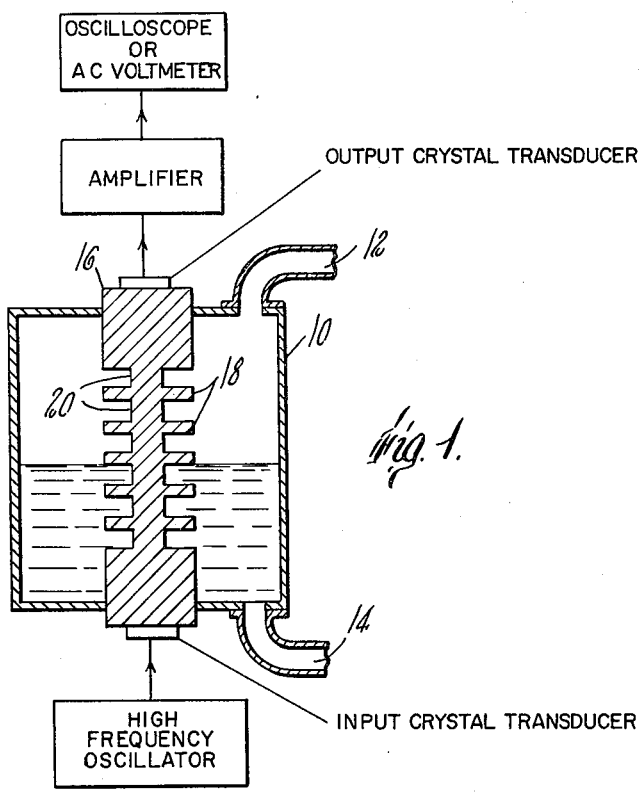
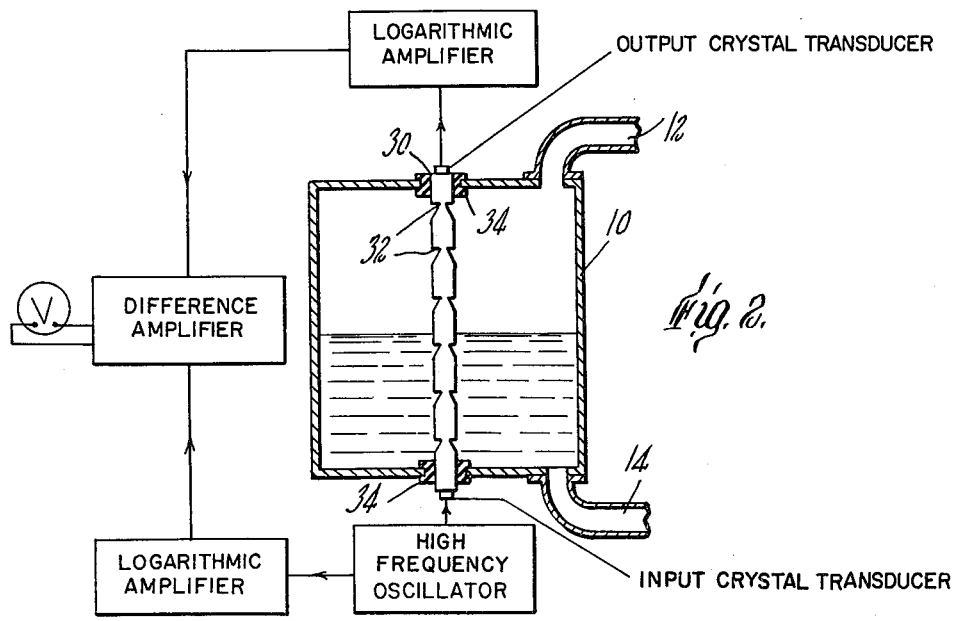

3,010,318
METHOD AND APPARATUS FOR MEASURING LIQUID LEVEL
Charles E. Mongan, 69 Dunster St., Cambridge, Mass.
Filed Apr. 2, 1959, Ser. No. 803,750
7 Claims. (Cl. 73—290)

This invention relates to a method and apparatus for measuring the location of a liquid-vapor interface or for measuring the depth of a liquid mass.

One object of the invention is to provide a method and apparatus for measuring the position of liquid level, i.e., the position of a liquid-vapor interface, by means of an ultrasonic transmission line or wave guide positioned to extend through the interface.

Another object is to provide a method and apparatus for measuring the position of a liquid-vapor interface, hence the depth of liquid present, in a vessel or container, by extending across the interface a segment of a transmission line or wave guide for ultrasonic compression waves and by measuring the acoustical impedance of the segment; e.g., by measuring the change in amplitude and/or phase of the waves transmitted through the segment or the change in power input.

A further object is to provide apparatus of the type described in which a segment of an ultrasonic transmission line or wave guide in the form of a delay line having a multiplicity of faces generally transverse to the direction of transmission of the waves is arranged to be in contact with the liquid the depth of which is to be measured.

Other and further objects will be apparent from the drawing and from the description which follows.

I have found that the depth of a liquid, i.e., the position of a liquid-vapor interface, is a function of the power loss of ultrasonic compression waves during their propagation through a wave guide or transmission line which extends across the interface so that one portion is in contact with the liquid and another portion is in contact with the vapor. By the term "ultrasonic waves" is meant compression waves having a frequency well beyond that of sound which is audible to human ears, i.e., a frequency upwards of 50 kilocycles per second. Best results are obtained with frequencies of 100 kilocycles up to as high as 5 to 10 megacycles per second, the frequency range from 0.5 to 2.5 megacycles being particularly preferred. The optimum frequency in any particular case will depend upon the dimensions and geometry of the transmission line or wave guide, particularly that segment of it which is in contact with the liquid material. Generally, it is desirable to have the wave length of the transmitted wave approximately equal to the diameter of the wave guide or transmission line. The waves passing through the transmission line may be longitudinal waves or shear waves or even torsional waves, although best results have been obtained with longitudinal waves.

The transmission line or wave guide, at least that segment of it which is in contact with the liquid, may be any conventional transmission line or wave guide for waves of this type and need not have any special form, although particular forms are preferred for obtaining maximum sensitivity in certain cases, as will hereinafter appear. The line may be constructed of any conventional conductive material such as stainless steel, aluminum, quartz, glass, ceramics and the like, of which stainless steel is preferred for most purposes because of the very low attenuation of waves transmitted through it. The line may be in the form of a simple solid rod of any desired cross-sectional configuration—for example, round, square, triangular, etc.—or it may be in the form of a hollow tube or even in the form of a sheet. Whatever the shape, it is essential that a segment of the transmission line of substantial length extend across in direct contact with the liquid-vapor interface the position of which is to be measured.

The extent of the loss in power of the waves during their passage through the transmission line or wave guide will vary depending upon the changes in acoustical impedance of the transmission line segment. The impedance in turn will vary depending on what proportion of the length of the line is in contact with the liquid as well as on the nature of the liquid. If the nature and physical properties of the liquid remain constant, therefore, the change in power loss or acoustical impedance can be used as a measure of the depth or level of liquid in a container into which the transmission line extends.

The change in acoustical impedance manifests itself and may be measured in a variety of ways. For practical purposes, the best mode of measuring such change is to measure the change in amplitude of the transmitted waves, although change in power input may also be used as well as change in the phase angle between the voltage (or pressure) and the current (or volume current) during transimssion through the wave guide or transmission line.

In order to measure change in amplitude, a source of ultrasonic waves such as a generator or transmitter must be provided, as well as a receiver. Both the transmitter and receiver may be connected to the transmission line closely adjacent opposite ends of that segment which is designed to be in contact with the interface or, if desired, they may be separated from the ends of the segment by a substantial length of transmission line. Preferably both the generator and transmitter are coupled as close to the ends of the operative segment as possible in order to provide maximum sensitivity. The transmitter and receiver may both be of conventional construction. The transmitter, for example, may comprise an electronic driver or high frequency oscillator generating electromagnetic waves of the desired frequency together with a transducer in the form of piezoelectric crystal, e.g., quartz crystal, to which the electromagnetic waves are applied, the crystal being coupled to a flat face of the transmission line by means of a liquid such as a silicone or other oil, as is well known. The receiver may comprise a similar transducer similarly coupled to the transmission line together with an electronic amplifier and means for measuring the amplitude of the amplified signal, such as an oscilloscope or an A.C. voltmeter.

In practicing the invention it will be found that if the transmitter provides ultrasonic waves the amplitude of which remains constant at a known value, it will be necessary merely to measure the amplitude of the output signal for several different levels of the liquid in question. When an unknown depth of liquid is present, the amplitude of the output signal is again measured and the desired depth value obtained by interpolation or extrapolation from the known values.

Where there is substantial variation in the amplitude of the waves produced by the transmitter, or where extreme accuracy is desired, it is desirable to be able to compare the amplitude of the transmitted wave directly with the amplitude of the wave introduced into the transmission line in order to obtain the difference in amplitude. This may be done, for example, by taking a sample signal from the input and a sample signal of the same sort from the output, feeding both of them to a logarithmic amplifier and placing the difference between the two signals on a meter.

While the present invention is effective when the segment of transmission line or wave guide is simply a cylindricla rod, greater sensitivity and accuracy may be obtained when it is constructed in such form that it presents a multiplicity of faces extending generally transversely of the direction of transmission or propagation of the waves. It is believed that such faces vibrate with the transmitted waves and that their vibration is damped by contact with the liquid, resulting in greater attenuation of the ultrasonic waves than is obtained in the case of a simple cylindrical rod; such a line constitutes a "delay line," analogous to a delay line for electrical transmission.

In the appended drawing:

FIG. 1 is a block diagram schematically illustrating one embodiment of the invention; and FIG. 2 is a block diagram schematically illustrating another embodiment of the invention.

The embodiment shown in FIG. 1 includes a steel container 10 having an inlet 12 and an outlet 14 for introducing and withdrawing the liquid material, such as water, oil, etc., the depth of which is to be determined, and a transmission line or wave guide 16 constructed of stainless steel and welded in place in apertures of suitable size and shape in the top and bottom of container 10. Transmission line 16 consists of a number of disks 18, 18 connected together by stalks 20, 20 of relatively small diameter. A conventional crystal transducer is coupled in the usual manner to the flat face at each end of transmission line 16, the input crystal transducer at the lower end of the transmission line being actuated by a high frequency oscillator generating electromagnetic waves having a frequency of the order of one megacycle. The output crystal transducer at the upper end of transmission line 16 is connected to a conventional amplifier which in turn provides a signal the amplitude of which can be observed or measured by means of either an oscilloscope or an A.C. voltmeter. Assuming that the power supply remains constant at some known value, the amplitude of the output signal received from the amplifier can then be determined when container 10 is filled to varying levels with the desired liquid so that line 16 extends across or through the vapor-liquid interface. It will be found that the amplitude of the output signal is a logarithmic function of the length of that part of transmission line 16 which is completely submerged in the liquid, so that the device can readily be calibrated. The device can be employed to measure the depth of dispersions of solid particles in either gases or liquids, all of which are equivalent to pure liquids for the purpose of the present invention.

The precise dimensions of the disks 18 and the stalks 20 for best results will depend upon the frequency of the ultrasonic waves employed, the nature of the material from which transmission line 16 is constructed, and the dimensions of container 10. For a container approximately four feet in length using a frequency of approximately one megacycle, excellent results have been obtained when the transmission line is constructed of stainless steel and disks 18, 18 are approximately 2¼ inches in diameter and ¼ inch thick, while stalks 20, 20 are ⅜ inch in diameter and approximately 1 inch long. The diameter of the container is not particularly critical so long as it is great enough to avoid interference, as in the form of echoes, with the characteristics of the transmission line. In general, it is desirable that the diameter of the chamber be at least twice the diameter of the transmission line in order to reduce possible interference to a minimum.

It should be noted that the device of the present invention may be used to determine liquid level within a container which is hermetically sealed and which is subject to wide temperature variations and that no electric current or charge and no radiation which might possibly affect the liquid need be introduced into the container. Neither agitation or stirring of the liquid nor bubbling of the liquid affects the operation of the device. These features also make the device particularly useful for measuring fluid level in a fluid-bed catalyst system.

In the embodiment shown in FIG. 2, a similar container 10 is provided with a transmission line 30 consisting of an aluminum rod provided with a multiplicity of circumferential notches 32, 32. The line 30 in this embodiment is sealed in place through suitable apertures in container 10 by means of rubber gaskets or sleeves 34. Input and output crystal transducers are coupled to the opposing ends of the transmission line segment in the usual manner, and means are provided for comparing the amplitude of the input and output signals by putting a sample of the input signal from the high frequency oscillator through a logarithmic amplifier and putting the output signal through a similar logarithmic amplifier, the signals from both amplifiers then being placed on a difference amplifier so as to provide a direct reading on a voltmeter. The change in volt meter reading is then directly proportional to the change in liquid level within container 10 and is unaffected by any variation in power supply. It will be apparent, of course, that the present invention is effective for measuring variations in liquid level accurately only when the liquid is of uniformly constant physical properties, and any change in the properties of the liquid will require another calibration of the device.

It is found that by suitable choice of frequency and of the geometric design of the transmission line, great sensitivity and accuracy can be obtained.

It is believed that the device of the present invention operates by the damping effect produced upon the transmission line by the liquid with which it is in contact. When the transmission line is a simple cylindrical rod, the damping is relatively small so that the sensitivity of the device is not very great. However, by changing the geometric design of the transmission line so as to provide a plurality of faces which are generally transverse to the direction of propagation of the waves, as in the two embodiments shown in FIGS. 1 and 2 of the drawing, the character of the line is changed so that it contains both inertance and acoustical capacitance, constituting a delay line consisting in effect of a series of masses connected by springs. Such an acoustical or mechanical system is analogous to an electrical ladder network containing a plurality of inductances and capacitances. The vibration of the masses in response to the transmitted waves in that portion of the line which is in contact with the liquid is damped by the liquid, converting some of the ultrasonic wave energy into heat and producing a corresponding attenuation of the transmitted wave energy which can be measured and which is a function of the physical properties of the liquid as well as of the proportion of the line in contact with the liquid.

While the device may be operated with a continuous transmitter, the entire system being in a steady state, it is also possible to employ a pulse generator and a gate circuit into which the high frequency oscillator feeds at the input end of the transmission line, thus reducing total power consumption.

Although specific embodiments of the invention have been described herein, it is not intended to limit the invention solely thereto, but to include all of the obvious variations and modifications within the spirit and scope of the appended claims.

What is claimed is:

1. Apparaus for determining the position of a liquid-vapor interface which comprises a segment of a solid ultrasonic transmission line mounted in position to cross said interface, means for supplying ultrasonic compression waves to said line segment at one end thereof, and means for measuring the acoustical impedance of said segment, said impedance varying as the position of said interface varies along said segment.

2. Apparatus for measuring the position of a liquid-vapor interface comprising a segment of a solid ultrasonic transmission line having means for supplying ultrasonic compression waves adjacent one end, a container for said liquid encompassing at least a portion of said segment, and means for measuring the acoustical impedance of said segment during transmission through it, said impedance varying as the position of said interface varies along said segment.

3. Apparatus as defined in claim 1 in which said line segment is a delay line having a plurality of faces generally transverse to the direction of transmission of the waves.

4. Apparatus for determining the position of a liquid-vapor interface within a container which comprises a solid ultrasonic transmission line mounted to extend into the interior of said container in position to cross said interface, means for supplying ultrasonic compression waves to said line adjacent one end thereof, and means for receiving and measuring the amplitude of transmitted ultrasonic waves adjacent the other end thereof.

5. Apparatus for measuring liquid level within a container comprising a segment of a solid ultrasonic transmission line mounted to extend generally vertically within said container to intercept the liquid surface at all levels which it is desired to measure, means for supplying ultrasonic compression waves to one end of said line segment, means for receiving transmitted ultrasonic compression waves at the other end of said line segment, and means for comparing the amplitude of the waves at opposite ends of said line segment, variations in amplitude corresponding to variations in liquid level.

6. Apparatus for measuring the position of a liquid-vapor interface which comprises means for generating ultrasonic compression waves, a solid delay line for transmitting said waves connected to said generating means, said delay line having a plurality of faces generally transverse to the direction of transmission of said waves, and means connected to the delay line for receiving and measuring the decrease in amplitude of the transmitted waves, a portion of said delay line between said generating means and said receiving means being adapted to extend across said interface.

7. Apparatus for measuring the depth of liquid which comprises a container for the liquid, a solid delay line for transmitting ultrasonic compression waves mounted in a generally vertical position within said container, said delay line having a plurality of faces extending generally transversely of the direction of transmission of said waves, a transducer for generating ultrasonic compression waves coupled to said delay line, an electronic driver for said transducer, a second transducer coupled to said delay line for receiving transmitted waves and converting them into an electrical signal, means for logarithmically amplifying a sample signal from said electronic driver and the signal from said second transducer, and means for measuring the difference between said two amplified signals.

References Cited in the file of this patent

UNITED STATES PATENTS

| 1,936,706 | Affel | Nov. 28, 1933 |
| 2,472,249 | De Giers et al. | June 7, 1949 |
| 2,522,433 | Dahlberg | Sept. 12, 1950 |
| 2,573,390 | Blanchard | Oct. 30, 1951 |
| 2,612,772 | McConnell | Oct. 7, 1952 |
| 2,787,160 | Van Valkenburg | Apr. 2, 1957 |
| 2,883,861 | Van Valkenburg et al. | Apr. 28, 1959 |

FOREIGN PATENTS

| 934,118 | France | Jan. 7, 1948 |
| 663,946 | Great Britain | Jan. 2, 1952 |